United States Patent
Asano et al.

(10) Patent No.: US 6,926,984 B2
(45) Date of Patent: Aug. 9, 2005

(54) POLYMER ELECTROLYTE MEMBRANE, METHOD FOR PRODUCING SAME, AND MEMBRANE ELECTRODE ASSEMBLY AND POLYMER ELECTROLYTE FUEL CELL COMPRISING SAME

(75) Inventors: Yoichi Asano, Saitama-ken (JP);
Masaaki Nanaumi, Saitama-ken (JP);
Hiroshi Sohma, Saitama-ken (JP);
Nagayuki Kanaoka, Saitama-ken (JP);
Nobuhiro Saito, Saitama-ken (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/050,134

(22) Filed: Jan. 18, 2002

(65) Prior Publication Data

US 2002/0164513 A1 Nov. 7, 2002

(30) Foreign Application Priority Data

Jan. 19, 2001 (JP) .................................... 2001-012490
Mar. 30, 2001 (JP) .................................... 2001-097802

(51) Int. Cl.$^7$ .............................................. H01M 8/12
(52) U.S. Cl. ............................... 429/32; 429/30; 429/33
(58) Field of Search ............................... 429/30, 32, 33

(56) References Cited

U.S. PATENT DOCUMENTS 5,403,675 A    4/1995  Ogata et al.
6,096,856 A  *  8/2000  Helmer-Metzmann et al. ... 528/374

FOREIGN PATENT DOCUMENTS

JP      6-29032      2/1994
JP      8-259710     10/1996
JP      2000-231928  8/2000

OTHER PUBLICATIONS

Nolte et al., "Partially Sulfonated Poly(Arylene Ether Sulfone)—A Versatile Proton Conducting Membrane Material for Modern Energy Conversion Technologies", Journal of Membrane Science, 83 (1993) 211–220.*

* cited by examiner

Primary Examiner—Dah-Wei Yuan
(74) Attorney, Agent, or Firm—Sughrue Mion, PLLC

(57) ABSTRACT

A polymer electrolyte membrane obtained by subjecting a sulfonated polyarylene membrane having an initial water content of 80–300 weight % to a hot-water treatment. A composite polymer electrolyte membrane comprising a matrix made of a first sulfonated aromatic polymer having a high ion exchange capacity, and a reinforcing material constituted by a second sulfonated aromatic polymer having a low ion exchange capacity in the form of fibers or a porous membrane.

4 Claims, 2 Drawing Sheets

POLYMER ELECTROLYTE MEMBRANE, METHOD FOR PRODUCING SAME, AND MEMBRANE ELECTRODE ASSEMBLY AND POLYMER ELECTROLYTE FUEL CELL COMPRISING SAME

FIELD OF THE INVENTION

The present invention relates to a polymer electrolyte membrane used in a polymer electrolyte fuel cell, a method for producing such a polymer electrolyte membrane, a membrane electrode assembly comprising such a polymer electrolyte membrane, and a polymer electrolyte fuel cell comprising a plurality of such membrane electrode assemblies.

PRIOR ART

As the depletion of oil resources, global warming, etc. have been becoming serious environmental problems, much attention has been paid to fuel cells as clean power sources for motors, and wide development is now carried out to put them into practical use. Particularly when fuel cells are mounted in automobiles, etc., they are preferably polymer electrolyte fuel cells for the purpose of reduction in weight.

A polymer electrolyte fuel cell has a structure in which a plurality of membrane electrode assemblies are stacked via separator plates, each membrane electrode assembly comprising a pair of electrodes consisting of a fuel electrode and an oxygen electrode and an ion-conducting, aromatic polymer membrane sandwiched by the electrodes. Each of the fuel electrode and the oxygen electrode has a catalytic layer in contact with the polymer electrolyte membrane and a gas-diffusion layer.

A fuel gas is introduced into the fuel electrode, while an oxidizing gas such as air, oxygen, etc. is introduced into the oxygen electrode. The fuel gas such as hydrogen, methanol, etc. introduced into the fuel electrode passes through the gas-diffusion layer to the catalytic layer, in which it forms protons by the action of a catalyst. Protons travel from the catalytic layer of the fuel electrode to the catalytic layer of the oxygen electrode via the polymer electrolyte membrane. Protons that have reached the catalytic layer of the oxygen electrode are reacted with the oxidizing gas by the action of the catalyst to form water with electrons discharged. Accordingly, electric current can be taken by connecting the fuel electrode and the oxygen electrode via a conductive wire.

Conventionally widely used for the polymer electrolyte membrane is a sulfonated, perfluoroalkylene polymer [for instance, Nafion® (available from du Pont)]. Though Nafion® has excellent proton conductivity and chemical resistance, it is disadvantageously extremely expensive. In addition, in view of increase in the outputs of fuel cells, demand is mounting on polymer electrolyte membranes having enough hot water resistance, oxidation resistance and creep resistance (mechanical strength) to withstand operation at high temperature and pressure, and the conventional Nafion® fails to sufficiently meet such demand.

Recently proposed as inexpensive polymer electrolyte membranes are ion-conducting, aromatic polymer membranes containing no fluorine or having decreased fluorine content. For instance, U.S. Pat. No. 5,403,675 proposes an ion-conducting, aromatic polymer membrane obtained by sulfonating rigid polyphenylene. In addition, sulfonated polyetheretherketone is known as an ion-conducting, aromatic polymer membrane.

However, an ion-conducting, aromatic polymer membrane does not exhibit sufficient ion conductivity unless it contains moisture to some extent. In addition, because it has a high dependency of ion conductivity on humidity, its ion conductivity at such a low relative humidity as 50% is extremely smaller than that at such a high relative humidity as 90%. Accordingly, a polymer electrolyte fuel cell comprising ion-conducting, aromatic polymer membranes as polymer electrolyte membranes is unlikely to exhibit the desired power-generating performance at a low relative humidity.

Further, various attempts have been made to improve the mechanical strength, etc. of a polymer electrolyte membrane without deteriorating its ion exchange performance. For instance, Japanese Patent Laid-Open No. 6-29032 proposes a polymer electrolyte membrane comprising an ion exchange resin filled in the pores of an oriented, porous polymer membrane for having improved mechanical strength.

Japanese Patent Laid-Open No. 8-259710 proposes a polymer electrolyte membrane having a structure in which an ion exchange resin is contained in the pores of an oriented, porous polymer membrane, whereby the polymer electrolyte membrane has improved mechanical strength and improved energy efficiency with decreased resistance.

Japanese Patent Laid-Open No. 2000-231928 proposes a polymer electrolyte membrane having high strength and high ion conductivity (low membrane resistance), which is obtained by adding a reinforcing material of polyethylene fibers to a polymer electrolyte of a perfluorocarbon polymer containing sulfonic groups.

However, the porous membranes or fibers used for these polymer electrolyte membranes are chemically stable polymers such as polytetrafluoroethylene (PTFE), polyethylene, etc., which have low ion conductivity and small expansion and shrinkage by the changes of temperature and humidity. On the other hand, ion exchange resins having high ion conductivity are subjected to large expansion and shrinkage by the changes of temperature and humidity. Therefore, they disadvantageously suffer from the peeling of the polymer electrolyte from porous membranes or fibers. The peeling of the polymer electrolyte contributes to increase in membrane resistance, resulting in decrease in the power-generating performance of fuel cells.

To improve the ion conductivity of a polymer electrolyte membrane, the polymer electrolyte should have a high ion exchange capacity. However, the higher the ion exchange capacity, the lower the mechanical strength of the polymer electrolyte membrane, and the likelier the polymer electrolyte membrane creeps. On the other hand, when the polymer electrolyte membrane has a low ion exchange capacity, it fails to exhibit sufficient ion conductivity, resulting in decrease in the power-generating performance of fuel cells.

OBJECTS OF THE INVENTION

Accordingly, a first object of the present invention is to provide a polymer electrolyte membrane having a low dependency of ion conductivity on humidity, and a membrane electrode assembly comprising such a polymer electrolyte membrane, and an inexpensive, polymer electrolyte fuel cell comprising a plurality of such membrane electrode assemblies.

A second object of the present invention is to provide a polymer electrolyte membrane having a sufficient power-generating performance regardless of the variations of temperature and humidity, high hot water resistance and oxidation resistance, and excellent mechanical strength such as creep resistance, etc., a method for producing such a polymer electrolyte membrane, a membrane electrode assembly comprising such a polymer electrolyte membrane, and a polymer electrolyte fuel cell comprising a plurality of such membrane electrode assemblies.

SUMMARY OF THE INVENTION

As a result of intense research in view of the above objects, the inventors have found; (a) by subjecting an ion-conducting, aromatic polymer membrane having a high initial water content to a hot-water treatment, it is possible to obtain a polymer electrolyte membrane having a low dependency of ion conductivity on humidity, and (b) by using a sulfonated aromatic polymer having a high ion exchange capacity for a matrix, and by adding a sulfonated aromatic polymer having a low ion exchange capacity in the form of fibers or a porous membrane for a reinforcing material, it is possible to obtain a polymer electrolyte membrane excellent in mechanical strength such as creep resistance, etc. without suffering from reduction in ion conductivity, hot water resistance and oxidation resistance. The present invention is based on these findings.

Thus, the first polymer electrolyte membrane of the present invention is a polymer electrolyte membrane obtained by subjecting an ion-conducting, aromatic polymer membrane to a hot-water treatment, said ion-conducting, aromatic polymer membrane having a maximum water absorption in a range of 80–300 weight % based on its dry weight before the hot-water treatment.

The above ion-conducting, aromatic polymer membrane is preferably a sulfonated polyarylene membrane. In addition, the above sulfonated polyarylene membrane is preferably subjected to a hot-water treatment comprising immersing the membrane in hot water at 80–95° C. for 0.5–5 hours.

The sulfonated polyarylene is a sulfonated arylene copolymer obtained by introducing a sulfonic group into a side chain of a copolymer comprising 30–95 mol % of a first aromatic monomer unit represented by the following chemical formula (1):

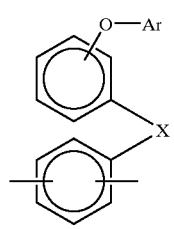

(1)

wherein Ar is an aryl group, and X is a bivalent electron-attractive group selected from the group consisting of —CO—, —CONH—, —(CF$_2$)p— wherein p is an integer of 1–10, —C(CF$_3$)$_2$—, —COO—, —SO— and —SO$_2$—, and 70–5 mol % of a second aromatic monomer unit represented by the following chemical formula (2):

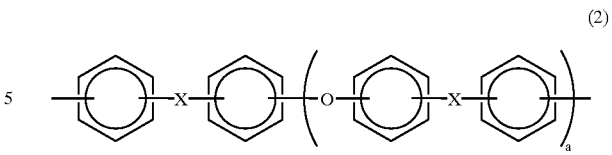

(2)

wherein X is the same as in the chemical formula (1) and may be the same as or different from each other, and a is an integer of 0–3.

The second polymer electrolyte membrane of the present invention is a composite polymer electrolyte membrane comprising a matrix made of a first sulfonated aromatic polymer having a high ion exchange capacity, and a reinforcing material made of a second sulfonated aromatic polymer having a low ion exchange capacity in the form of fibers or a porous membrane.

Both of the first and second sulfonated aromatic polymers are preferably non-fluorinated, sulfonated aromatic polymers. The first and second sulfonated aromatic polymers preferably have the same skeleton except for ion exchange capacity. Both sulfonated aromatic polymers preferably contain phenylene groups, and are particularly preferably sulfonated polyetheretherketone. Both sulfonated aromatic polymers may partially contain fluorine.

The first sulfonated aromatic polymer has an ion exchange capacity of 1.0–2.8 meq/g, and the second sulfonated aromatic polymer has an ion exchange capacity of 0.5–1.5 meq/g. H$^+$ in sulfonic groups of the second sulfonated aromatic polymer is at least partially substituted by Na$^+$.

The first method for producing a composite polymer electrolyte membrane comprising a matrix made of a first sulfonated aromatic polymer having a high ion exchange capacity, and a reinforcing material constituted by a fibrous product made of a second sulfonated aromatic polymer having a low ion exchange capacity according to the present invention comprises using a casting method to form the composite polymer electrolyte membrane, the casting method comprising uniformly dispersing the fibrous product of the second sulfonated aromatic polymer in a solution of the first sulfonated aromatic polymer.

The second method for producing a composite polymer electrolyte membrane comprising a matrix made of a first sulfonated aromatic polymer having a high ion exchange capacity, and a reinforcing material constituted by a porous membrane made of a second sulfonated aromatic polymer having a low ion exchange capacity according to the present invention comprises impregnating the porous membrane of the second sulfonated aromatic polymer with a solution of the first sulfonated aromatic polymer.

The membrane electrode assembly of the present invention has a structure in which the above first or second polymer electrolyte membrane is sandwiched by a pair of electrodes.

The polymer electrolyte fuel cell of the present invention has a structure in which a plurality of the above membrane electrode assemblies are stacked via separator plates.

DESCRIPTION OF THE PREFERRED EMBODIMENTS

Figure 1:
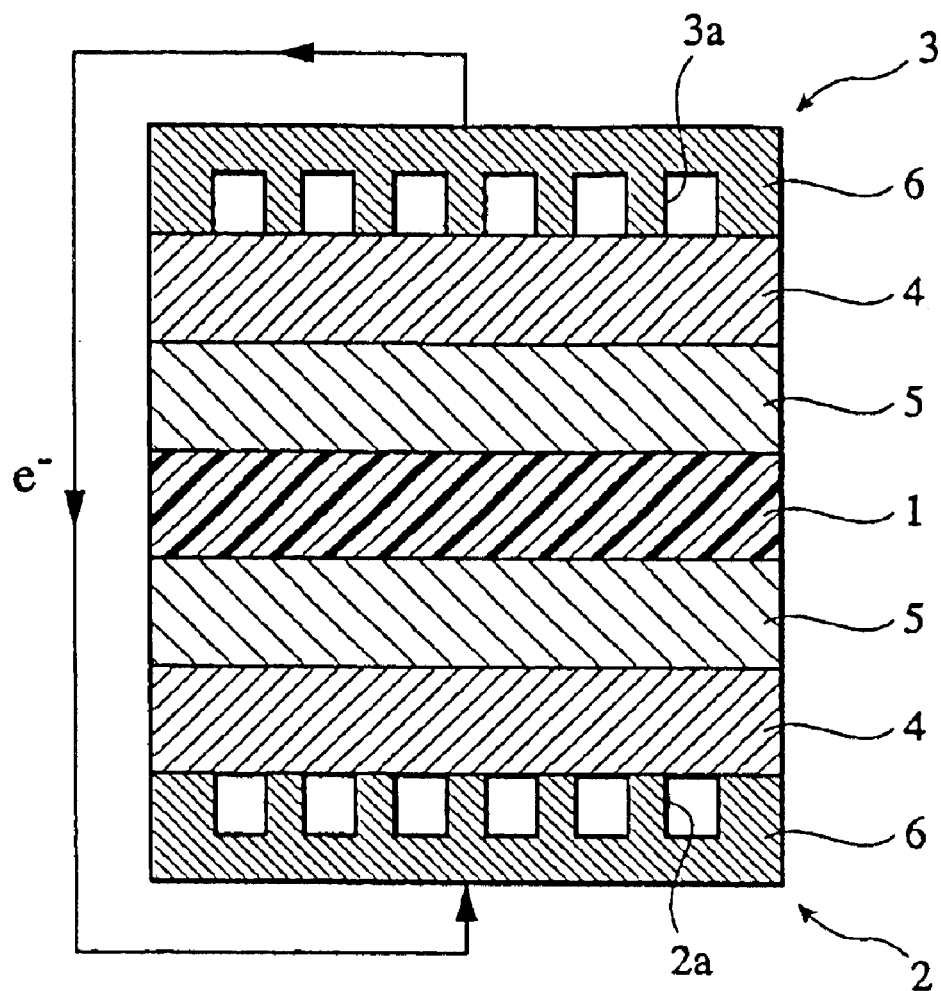
FIG. 1 is a cross-sectional view showing a membrane electrode assembly constituting a polymer electrolyte fuel cell according to the present invention.

The present invention will be explained below in detail referring to the drawings attached hereto, and it should be noted that this explanation is applicable to both of the first and second polymer electrolyte membranes unless otherwise mentioned.

[1] Membrane Electrode Assembly

The polymer electrolyte fuel cell has a structure in which a plurality of membrane electrode assemblies generally shown in FIG. 1 are stacked via separator plates. Each membrane electrode assembly is constituted by a polymer electrolyte membrane 1, and an oxygen electrode 2 and a fuel electrode 3 on both sides of the polymer electrolyte membrane 1, these members being sandwiched by separator plates 6, 6. The oxygen electrode 2 and the fuel electrode 3 are respectively constituted by gas-diffusion layers 21, 31 and catalytic layers 22, 32. The separator plate 6 on the side of the oxygen electrode 2 has oxygen paths 6a through which an oxygen-containing gas such as air, etc. flows, while the separator plate 6 on the side of the fuel electrode 3 has fuel paths 6b through which a fuel gas such as hydrogen, etc. flows.

(A) Polyelectrolyte Membrane (1) First Polymer Electrolyte Membrane

The first polymer electrolyte membrane is obtained by subjecting an ion-conducting, aromatic polymer membrane to a hot-water treatment, the ion-conducting, aromatic polymer membrane having a maximum water absorption in a range of 80–300 weight % based on its dry weight before the hot-water treatment. Here, "maximum water absorption before the hot-water treatment" is simply called "initial water content."

(a) Ion-Conducting Aromatic Polymer Membrane

A preferred example of the ion-conducting aromatic polymer is a sulfonated arylene copolymer obtained by introducing a sulfonic group into a side chain of a copolymer comprising 30–95 mol % of a first aromatic monomer unit represented by the following chemical formula (1):

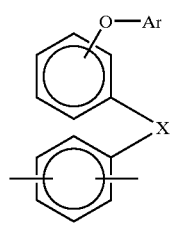

(1)

wherein Ar is an aryl group, and X is a bivalent electron-attractive group selected from the group consisting of —CO—, —CONH—, —(CF$_2$)$_p$— wherein p is an integer of 1–10, —C(CF$_3$)$_2$—, —COO—, —SO— and —SO$_2$—, and 70–5 mol % of a second aromatic monomer unit represented by the following chemical formula (2):

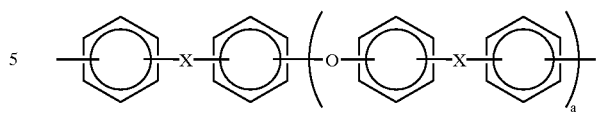

(2)

wherein X is the same as in the chemical formula (1) and may be the same as or different from each other, and a is an integer of 0–3.

The first aromatic monomer may be, for instance, 2,5-dichloro-4'-phenoxybenzophenone, etc. The second aromatic monomer may be, for instance, 4,4'-dichlorobenzophenone, 4,4'-bis (4-chlorobenzoyl) diphenyl ether, etc.

When the first aromatic monomer unit is less than 30 mol %, and when the second aromatic monomer unit exceeds 70 mol %, the arylene copolymer does not have a necessary ion exchange capacity as a polymer electrolyte membrane. On the other hand, when the first aromatic monomer unit exceeds 95 mol %, and when the second aromatic monomer unit is less than 5 mol %, too many sulfonic groups are introduced into the arylene copolymer, resulting in the arylene copolymer provided with a weak molecular structure.

Another example of the polyarylene is polyetheretherketone.

Because the polyarylene does not contain fluorine in its molecular structure, or because the arylene copolymer contains fluorine only as an electron-attractive group, they contribute to cost reduction of the inexpensive, polymer electrolyte fuel cell.

The ion-conducting, aromatic polymer membrane is dissolved in a solvent such as N-methylpyrrolidone, etc., and formed into a polymer electrolyte membrane having a desired dry thickness by a casting method.

(b) Sulfonation

The sulfonated, ion-conducting, aromatic polymer membrane is obtained by sulfonating the ion-conducting, aromatic polymer membrane with concentrated sulfuric acid.

When the arylene copolymer is used as the ion-conducting, aromatic polymer membrane, sulfonic groups tend to be introduced into aromatic rings not adjacent to electron-attractive groups, rather than into those adjacent to the electron-attractive groups. Accordingly, the sulfonic groups are introduced mostly into the aromatic rings represented by Ar in the first aromatic monomer unit. Thus, with varying molar ratios of the first aromatic monomer unit to the second aromatic monomer unit, the amount of the sulfonic group introduced, in other words, an ion exchange capacity can be controlled.

(c) Initial Water Content

Though the sulfonated polyarylene membrane exhibits ion conductivity by containing moisture, its ion conductivity depends largely on humidity. While the sulfonated polyarylene membrane shows a low ion conductivity at a low humidity, it has extremely high ion conductivity at a high humidity. Namely, the sulfonated polyarylene membrane has ion conductivity largely dependent on humidity. However, to obtain stable output at the initial stage of operation and during a stationary operation, the sulfonated polyarylene membrane used as a polymer electrolyte membrane should have as small dependency of ion conductivity on humidity as possible.

How much the ion conductivity of the sulfonated polyarylene membrane depends on humidity can be expressed by the initial water content of the sulfonated polyarylene membrane. The initial water content is a maximum water absorption that the sulfonated polyarylene membrane can have before the hot-water treatment, expressed by weight % based on the dry weight (100 weight %) of the sulfonated polyarylene membrane.

The initial water content of the sulfonated polyarylene membrane should be 80–300 weight %. When the initial water content of the sulfonated polyarylene membrane is less than 80 weight % based on its dry weight, sufficient ion conductivity cannot be obtained even with the hot-water treatment. On the other hand, when the initial water content exceeds 300 weight % based on its dry weight, the sulfonated polyarylene membrane has a large rate of expansion and shrinkage by heat, failing to obtain the desired durability.

(d) Hot-Water Treatment

To have the reduced dependency of ion conductivity on humidity, the sulfonated polyarylene membrane is subjected to a hot-water treatment. The hot-water treatment of the sulfonated, ion-conducting, aromatic polymer membrane is carried out by (1) immersing only the sulfonated, ion-conducting, aromatic polymer membrane in hot water, or (2) immersing a membrane electrode assembly (MEA) comprising the sulfonated, ion-conducting, aromatic polymer membrane in hot water. In both cases, the temperature of hot water is in a range of 80–95° C., and the immersing time is 0.5–5 hours.

In the hot-water treatment, when the temperature of hot water is lower than 80° C., or when the immersing time is less than 0.5 hours, the sulfonated, ion-conducting, aromatic polymer membrane cannot be provided with sufficiently reduced dependency of ion conductivity on humidity. On the other hand, when the temperature of hot water exceeds 95° C., or when the immersing time exceeds 5 hours, the sulfonated, ion-conducting, aromatic polymer membrane has reduced mechanical strength.

The hot-water treatment may be carried out by aging the sulfonated, ion-conducting, aromatic polymer membrane, by operating a polymer electrolyte fuel cell comprising it under high-temperature, high-humidity conditions of 80–95° C. and a relative humidity of 90% for 0.5–5 hours.

The hot-water treatment provides the sulfonated polyarylene membrane with increased moisture-holding capability under low-humidity conditions, resulting in high ion conductivity under low-humidity conditions. Accordingly, the sulfonated polyarylene membrane has sufficiently small dependency of ion conductivity on humidity.

(2) Second Polymer Electrolyte Membrane

The second polymer electrolyte membrane is a composite polymer electrolyte membrane comprising a matrix made of a sulfonated aromatic polymer having a high ion exchange capacity (milli-equivalent of ion-exchangeable group (for instance, sulfonic group) per 1 gram), and a reinforcing material made of a sulfonated aromatic polymer having a low ion exchange capacity in the form of fibers or a porous membrane.

The sulfonated aromatic polymers constituting the matrix and the reinforcing material preferably have the same skeleton structure except for ion exchange capacity. This makes the matrix and the reinforcing material have substantially the same thermal expansion coefficient, thereby preventing the matrix from peeling from the reinforcing material.

To meet the requirements of ion conductivity, hot water resistance, oxidation resistance, and mechanical strength such as creep resistance, etc., and to achieve cost reduction, the aromatic polymers constituting the skeletons of both sulfonated aromatic polymers are preferably fluorinated or non-fluorinated aromatic polymers. The sulfonated aromatic polymers constituting the matrix and the reinforcing material are preferably those have phenylene groups in their main chains, particularly sulfonated polyetheretherketone.

Polyetheretherketone generally has the following chemical formula (3):

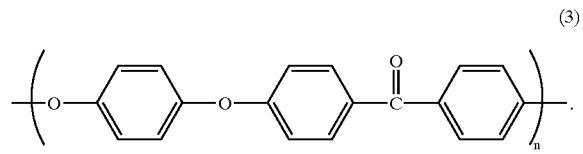

The polymer electrolyte for the matrix has a high ion exchange capacity, while the polymer electrolyte for a fibrous product or a porous membrane has a low ion exchange capacity. Specifically, it is preferable that the polymer electrolyte for the matrix has an ion exchange capacity of 1.0–2.8 meq/g, and that the polymer electrolyte for the fibrous product or the porous membrane has an ion exchange capacity of 0.5–1.5 meq/g.

When the polymer electrolyte for the matrix has an ion exchange capacity of less than 1.0 meq/g, its ion conductivity is insufficient. On the other hand, when its ion conductivity exceeds 2.8 meq/g, it has insufficient mechanical strength such as creep resistance, etc. When the polymer electrolyte for the fibrous product or the porous membrane has an ion exchange capacity of less than 0.5 meq/g, its ion conductivity and adhesion are insufficient. On the other hand, when its ion conductivity exceeds 1.5 meq/g, it has insufficient creep resistance.

The ion exchange capacity of the polymer electrolyte for the matrix is preferably at least 0.5 meq/g larger than that of the polymer electrolyte for the fibrous product or the porous membrane. When the difference between them is less than 0.5 meq/g, there is insufficient effect of their combination.

In a case where the sulfonated aromatic polymer having a low ion exchange capacity is in the form of fibers, they may be either long fibers or short fibers. In the case of long fibers, they may be in the form of woven fabrics or non-woven fabrics. In the case of nonwoven fabrics, it is preferable to calendar the nonwoven fabrics to properly fuse fibers in the nonwoven fabrics. In any cases, the fibrous sulfonated aromatic polymer having a low ion exchange capacity preferably has a diameter of about 1–15 μm. When its diameter is less than 1 μm, only insufficient reinforcing effect is provided. On the other hand, when its diameter exceeds 15 μm, the composite polymer electrolyte membrane has reduced ion conductivity.

In the case of a porous membrane, it preferably has a porosity of about 50–80% and an average pore size of about 0.2–3 μm. When the porosity and the average pore size are less than the above lower limits, the composite polymer electrolyte membrane has insufficient ion conductivity. On the other hand, when they are more than the above upper limits, only insufficient reinforcing effect can be obtained. Because the performance of the composite polymer electrolyte membrane is affected by the thickness of the porous membrane, the porous membrane is preferably as thick as 15–75 μm.

In the sulfonated aromatic polymer having a low ion exchange capacity, which constitutes a fibrous product or a porous membrane, at least part of $H^+$ in its sulfonic groups is preferably substituted by $Na^+$. This substitution improves the adhesion of the matrix to the fibrous product or the porous membrane, resulting in decrease in the resistance of the composite polymer electrolyte membrane.

In the composite polymer electrolyte membrane, a weight ratio of the matrix to the fibrous product or the porous membrane is preferably 3:1–1:3. When the weight ratio of matrix/(fibrous product or porous membrane) exceeds 3:1, there is provided only insufficient reinforcing effect by the fibrous product or the porous membrane. On the other hand, when the weight ratio is less than 1:3, the composite polymer electrolyte membrane has insufficient ion conductivity. The more preferred weight ratio of matrix/(fibrous product or porous membrane) is 2/1–1/1.25.

As described above, by using a sulfonated aromatic polymer having a high ion exchange capacity for a matrix, and a fibrous product or a porous membrane made of a sulfonated aromatic polymer having a low ion exchange capacity for a reinforcing material, it is possible to obtain a composite polymer electrolyte membrane having high ion conductivity and creep resistance and thus high efficiency and durability. Incidentally, the composite polymer electrolyte membrane of the present invention preferably has a thickness of about 15–75 μm.

(B) Electrode

In the polymer electrolyte fuel cell, each gas-diffusion layer 21, 31 of the oxygen electrode 2 and the fuel electrode 3, which is constituted by a carbon paper and a lower layer, may be formed, for instance, by mixing carbon black and polytetrafluoroethylene (PTFE) at a predetermined weight ratio, uniformly dispersing them in an organic solvent such as ethylene glycol, etc. to form a slurry, coating the carbon paper with the slurry on one side, and drying it to form the lower layer.

Each catalytic layer 22, 32 may be formed by uniformly mixing catalyst particles comprising platinum carried on carbon black (furnace black) at a predetermined weight ratio, with a solution of an ion-conducting binder of a sulfonated perfluoroalkylene aromatic polymer [for instance, Nafion® (available from du Pont)] in a solvent such as isopropanol, n-propanol, etc. at a predetermined weight ratio to form a catalyst paste, screen-printing the resultant catalyst paste on the lower layer in such a predetermined platinum content, and drying it. The drying preferably comprises, for instance, a first drying at 60° C. for 10 minutes, and then vacuum drying at 120° C.

The polymer electrolyte membrane is hot-pressed while being sandwiched by the catalytic layers 22, 32 of the oxygen electrode 2 and the fuel electrode 3, to form the polymer electrolyte fuel cell. The hot-pressing may comprises, for instance, a primary pressing at 80° C. and 5 MPa for 2 minutes, and then a secondary pressing at 160° C. and 4 MPa for 1 minute.

[2] Method for Producing Composite Polymer Electrolyte Membrane (A) Production of Fibrous Product or Porous Membrane The sulfonated aromatic polymer having a low ion exchange capacity is dissolved in an organic solvent such as N-methylpyrrolidone, etc. to form a uniform solution. To produce a fibrous product or a porous membrane from this uniform solution, known spinning methods may be utilized in the case of the fibers. In the case of the porous membrane, the uniform solution may be mixed with a predetermined amount of a foaming agent and formed into a membrane by a casting method, followed by heating in a state that there remains a slight amount of an organic solvent in the membrane, to foam the membrane. Of course, the formation of the sulfonated aromatic polymer having a low ion exchange capacity into fibers or a porous membrane is not limited to the above methods, and any known methods can be utilized.

In the sulfonated aromatic polymer having a low ion exchange capacity constituting a fibrous product or a porous membrane, $H^+$ in sulfonic groups is preferably substituted at least partially by $Na^+$. This substitution can be carried out, for instance, by immersing the fibrous product or the porous membrane in an aqueous solution containing $Na^+$ such as an aqueous solution of sodium chloride, etc. The aqueous $Na^+$-containing solution may have a concentration of about 0.01–2 mol/L at a temperature of about 25° C. The immersing time is preferably controlled such that the substitution of $H^+$ with $Na^+$ is about 5–50%.

(B) Production of Composite Polymer Electrolyte Membrane

To produce the composite polymer electrolyte membrane containing a fibrous product, the fibrous product made of the sulfonated aromatic polymer having a low ion exchange capacity is added to a solution of the sulfonated aromatic polymer having a high ion exchange capacity in an organic solvent, cast onto a flat mold, and then dried.

To produce the composite polymer electrolyte membrane containing a porous membrane made of the sulfonated aromatic polymer having a low ion exchange capacity, the porous membrane may be impregnated with a solution of the sulfonated aromatic polymer having a high ion exchange capacity.

The present invention will be explained in detail referring to the following EXAMPLES without intention of restricting the present invention thereto.

EXAMPLE 1

First, an ion-conducting, aromatic polymer membrane made of a sulfonated polyarylene represented by the following chemical formula (4):

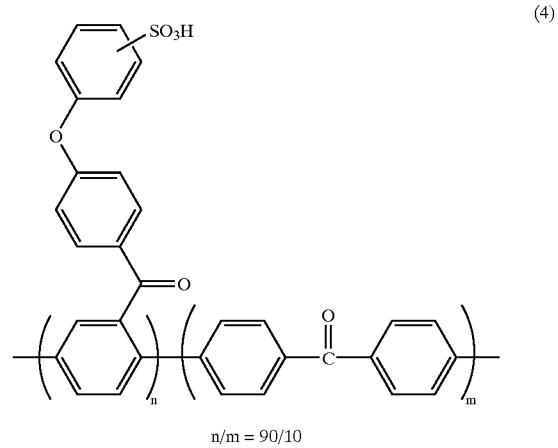

n/m = 90/10 and having a weight-average molecular weight of 100,000 and an ion exchange capacity of 2.3 meq/g was dissolved in N-methylpyrrolidone, and formed into a polymer electrolyte membrane 1 having a dry thickness of 50 μm by a casting method.

Carbon black was mixed with polytetrafluoroethylene (PTFE) at a weight ratio of carbon black:PTFE=4:6, and uniformly dispersed in ethylene glycol to form a slurry. The slurry was applied onto one surface of a carbon paper, and then dried to form a lower layer, thereby forming a gas-diffusion layers 21, 31 each constituted by a carbon paper and a lower layer.

Catalyst particles comprising platinum carried on furnace black at a weight ratio of furnace black:platinum=1:1 were uniformly mixed with a solution of an ion-conducting binder comprising a sulfonated perfluoroalkylene aromatic polymer [Nafion® (available from du Pont)] in isopropanol/n-propanol, to prepare a catalyst paste at a weight ratio of catalyst particles:binder=8:5. The resultant catalyst paste was screen-printed on the lower layer in a platinum content of 0.5 mg/cm², dried at 60° C. for 10 minutes, and then subjected to vacuum drying at 120° C. to form catalytic layers 22, 32.

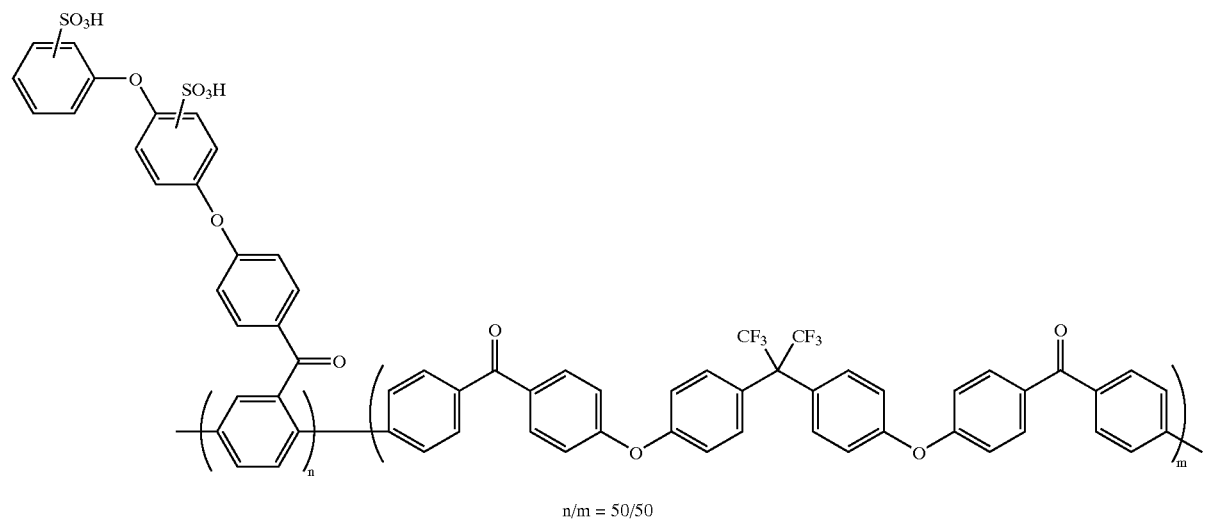

(5)

n/m = 50/50

The polymer electrolyte membrane 1 sandwiched by the catalytic layers 22, 32 of the oxygen electrode 2 and the fuel electrode 3 was subjected to a primary pressing at 80° C. and 5 MPa for 2 minutes, and then to a secondary pressing at 160° C. and 4 MPa for 1 minute, to form membrane electrode assembly for a polymer electrolyte fuel cell.

The above polymer electrolyte had an initial water content of 114 weight %. This polymer electrolyte membrane was subjected to a hot-water treatment by immersion in hot water at 95° C. for 1 hour. The ion conductivity of the polymer electrolyte membrane was measured before and after the hot-water treatment. The ion conductivity was converted from the resistance values obtained by measurement by a AC two-terminal method under the conditions of 85° C., a voltage of 1 V and a frequency of 10 kHz. The measurement of resistance of the polymer electrolyte membrane was carried out at a relative humidity of 50% and 90%, respectively, before and after the hot-water treatment.

Assuming that A represents the ion conductivity at a relative humidity of 50%, and that B represents the ion conductivity at a relative humidity of 90%, an ion conductivity variation ratio was expressed by a B/A ratio. In addition, assuming that C represents a B/A ratio of the polymer electrolyte membrane before the hot-water treatment, and that D represents a B/A ratio of the polymer electrolyte membrane after the hot-water treatment, a D/C ratio was used as a measure of decrease in the dependency of ion conductivity on humidity. The initial water content of the polymer electrolyte membrane, their B/A ratios before and after the hot-water treatment, and their D/C ratios are shown in Table 1.

EXAMPLE 2

A polymer electrolyte fuel cell was produced in the same manner as in EXAMPLE 1 except for preparing a polymer electrolyte membrane using an ion-conducting, aromatic polymer membrane made of a sulfonated polyarylene represented by the following chemical formula (5):

and having a weight-average molecular weight of 60,000 and an ion exchange capacity of 1.7 meq/g.

This ion-conducting, aromatic polymer membrane had an initial water content of 94 weight % based on the aromatic polymer. The ion conductivity of this polymer electrolyte membrane was measured before and after the hot-water treatment. The initial water content of the polymer electrolyte membrane, their B/A ratios before and after the hot-water treatment, and their D/C ratios are shown in Table 1.

EXAMPLE 3

An polymer electrolyte fuel cell was produced in the same manner as in EXAMPLE 1 except for preparing a polymer electrolyte membrane using an ion-conducting, aromatic polymer membrane made of a sulfonated polyarylene represented by the chemical formula (4) and having an ion exchange capacity of 2.5 meq/g.

This ion-conducting, aromatic polymer membrane had an initial water content of 276 weight % based on the sulfonated polyarylene. The ion conductivity of this polymer electrolyte membrane was measured before and after the hot-water treatment. The initial water content of the polymer electrolyte membrane, their B/A ratios before and after the hot-water treatment, and their D/C ratios are shown in Table 1.

EXAMPLE 4

An polymer electrolyte fuel cell was produced in the same manner as in EXAMPLE 1 except for preparing a polymer electrolyte membrane using an ion-conducting, aromatic polymer membrane made of sulfonated polyarylene represented by the following chemical formula (6):

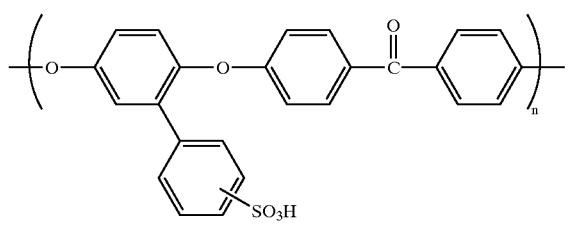

(6)

and having an ion exchange capacity of 1.5 meq/g.

This ion-conducting, aromatic polymer membrane made of sulfonated polyetheretherketone had an initial water content of 300 weight % based on sulfonated polyetheretherketone. The ion conductivity of this polymer electrolyte membrane was measured before and after the hot-water treatment. The initial water content of the polymer electrolyte membrane, their B/A ratios before and after the hot-water treatment, and their D/C ratios are shown in Table 1.

TABLE 1

| No. | Initial Water Content (weight %) | B/A Before Hot-Water Treatment | B/A After Hot-Water Treatment | D/C |
|---|---|---|---|---|
| EXAMPLE 1 | 114 | 20.58 | 8.17 | 0.40 |
| EXAMPLE 2 | 94 | 30.25 | 10.0 | 0.33 |
| EXAMPLE 3 | 276 | 11.03 | 5.0 | 0.45 |
| EXAMPLE 4 | 300 | 272.75 | 70.5 | 0.26 |

It is clear from Table 1 that any polymer electrolyte membrane made of an ion-conducting aromatic polymer having an initial water content of 94–300 weight % has a large ratio (B/A) of an ion conductivity B at a relative humidity of 90% to an ion conductivity A at a relative humidity of 50% before the hot-water treatment, suggesting that it has high dependency of ion conductivity on humidity. However, any polymer electrolyte membrane after the hot-water treatment had a small B/A ratio, suggesting that the hot-water treatment reduced the dependency of ion conductivity on humidity. As is clear from the comparison of D/C ratios shown in Table 1, the reduction of dependency of the ion conductivity of the polymer electrolyte membrane on humidity was in a range of 0.26–0.45 times, which is considered as an effective range.

EXAMPLE 5

A commercially available polyetheretherketone represented by the above chemical formula (3) was sulfonated to prepare high-sulfonated polyetheretherketone having an ion exchange capacity of 1.5 meq/g, which was then mixed with N-methylpyrrolidone at a weight ratio of 95:5 to prepare a polymer electrolyte solution. Also, a commercially available polyetheretherketone represented by the above chemical formula (3) was sulfonated to prepare low-sulfonated polyetheretherketone having an ion exchange capacity of 1.0 meq/g. The resultant low-sulfonated polyetheretherketone was dissolved in N-methylpyrrolidone, and the resultant solution (polymer concentration: 10 weight %) was spun to form fibers having an average diameter of 5 μm. Incidentally, the ion exchange capacity was controlled by changing acid treatment conditions (concentration of fumed sulfuric acid, immersing time).

The resultant fibers were immersed in an aqueous solution of sodium chloride of 2 N at 25° C. for 30 minutes to substitute H+ in sulfonic groups with Na+, thereby forming a fibrous reinforcing material. The above polymer electrolyte solution was uniformly mixed with the fibrous reinforcing material at a weight ratio by solid content of 90:10, and subjected to a casting method to produce a composite polymer electrolyte membrane having a dry thickness of 50 μm.

EXAMPLE 6

A commercially available polyetheretherketone represented by the above chemical formula (3) was sulfonated to prepare high-sulfonated polyetheretherketone having an ion exchange capacity of 1.5 meq/g, which was then mixed with N-methylpyrrolidone at a weight ratio of 95:5 to form a polymer electrolyte solution. Also, a commercially available polyetheretherketone represented by the above chemical formula (3) was sulfonated to prepare low-sulfonated polyetheretherketone having an ion exchange capacity of 1.0 meq/g.

The low-sulfonated polyetheretherketone was mixed with particles of laminar silicate, etc. having poor acid resistance and then cast. The resultant membrane was treated with 5 N hydrochloric acid to remove the particles to obtain a porous membrane having a thickness of 30 μm. The resultant porous membrane had an average pore size of 2 μm and a porosity of 65%.

This porous membrane was immersed in an aqueous solution of sodium chloride of 2 N at 25° C. for 30 minutes to substitute H+ in sulfonic groups with Na+, thereby obtaining a reinforcing material. The reinforcing material in the form of a porous membrane was impregnated with the above polymer electrolyte solution at weight ratio of 70:30 by solid content to produce a composite polymer electrolyte membrane having a dry thickness of 50 μm.

COMPARATIVE EXAMPLE 1

A solution of a partial copolymer of styrene and divinyl benzene (styrene:divinyl benzene=20:1) was produced in the same manner as in EXAMPLE 1 of Japanese Patent Laid-Open No. 8–259710. This solution was uniformly mixed with a reinforcing material of PTFE fibers having a diameter of 5 μm at a weight ratio of 90:10 by solid content, and formed into a composite polymer electrolyte membrane having a dry thickness of 50 μm by a casting method.

COMPARATIVE EXAMPLE 2

Two oriented, porous PTFE membranes (8 cm×8cm, thickness: 15 μm, porosity: 70%) were prepared in the same manner as in EXAMPLE 6 of Japanese Patent Laid-Open No. 8–259710, and one of them was provided with a window of 6 cm×6 cm at a center. The oriented, porous PTFE membrane having a window was sandwiched by two glass plates of 8 cm×8 cm, and a solution of the same ion exchange resin material as in COMPARATIVE EXAMPLE 1 was poured into the window (gap width: 55 μm) of the oriented porous membrane. In this state, copolymerization was completed. After removing the glass plates, the ion exchange resin material was sulfonated with fumed sulfuric acid. The resultant composite polymer electrolyte membrane having a thickness of 50 μm had an ion exchange resin held in the pores of the oriented, porous PTFE membrane.

COMPARATIVE EXAMPLE 3

A composite polymer electrolyte membrane having a dry thickness of 50 μm was produced in the same manner as in EXAMPLE 1 except for using PTFE in place of the low-sulfonated polyetheretherketone for a fibrous reinforcing material having a diameter of 5 μm.

Evaluation (1) Q Value

With respect to the polymer electrolyte membranes of EXAMPLES 5 and 6 and COMPARATIVE EXAMPLES 1–3, a cycle consisting of immersion in hot water at 80° C. for 10 minutes and immersion in water at 20° C. for 10 minutes was repeated 30 times. Thereafter, each polymer electrolyte membrane was coated with electrodes on both surfaces, to measure voltage when electric current of 0.2 A/cm$^2$ was caused to flow through the membrane. Also, a Q value, which was a measure of the adhesion of a matrix to a reinforcing material, was measured according to the following method. The measurement results are shown in Table 1.

Figure 2:
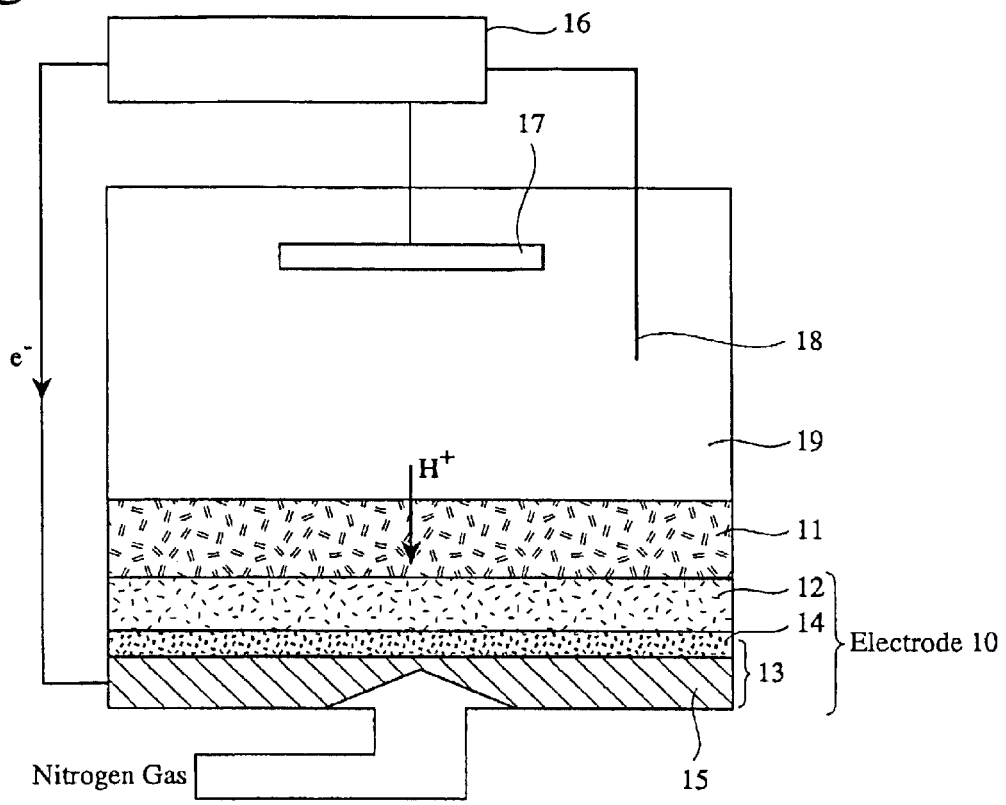
FIG. 2 is a schematic cross-sectional view showing an apparatus for measuring the Q value of the membrane electrode assembly of the present invention.

The measurement of the Q value was carried out using a membrane electrode assembly shown in FIG. 2. This membrane electrode assembly had an electrode 10 only on one side of the polymer electrolyte membrane 11. The electrode 10 consisted of a catalytic layer 12 and a gas-diffusion layer 13 (lower layer 14 and carbon paper 15). A surface of the polymer electrolyte membrane 11, to which no electrode 10 was attached, was in contact with an aqueous sulfuric acid solution 19 of pH 1, and the electrode 10 was in contact with a nitrogen gas. A reference electrode 18 and a counter electrode 17 were immersed in an aqueous sulfuric acid solution 19, and the counter electrode 17 was connected to the gas-diffusion layer 13 of the membrane electrode assembly.

When the potentiostat 16 applied voltage between gas-diffusion layer 13 and the aqueous sulfuric acid solution 19, protons in the aqueous sulfuric acid solution 19 travel through the polymer electrolyte membrane 11 to the electrode 10, thereby carrying out the exchange of electrons. Namely, when protons reach platinum surfaces in the catalyst particles, electrons are provided from platinum. In an opposite case, hydrogen atoms adsorbed to the catalyst particles provide electrons to platinum, so that they diffuse as protons in the aqueous sulfuric acid solution.

Figure 3:
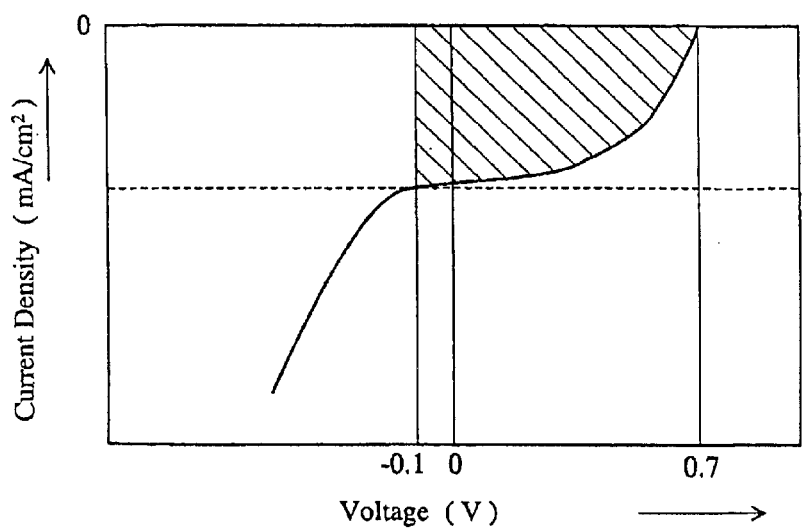
FIG. 3 is a graph showing a discharge curve obtained as a result of measuring a current density in a predetermined voltage range, to determine the Q value of the membrane electrode assembly of the present invention.

By scanning voltage from −0.1 V to +0.7 V, the Q value (C/cm$^2$) can be determined from the proton peak area on the adsorption side. The measurement results are shown in FIG. 3. In the discharge curve shown in FIG. 3, the Q value is defined as the amount of electric charge per a unit area of the membrane electrode assembly. In the discharge curve shown in FIG. 3, the Q value indicates the amount of electric charge per a unit area of the membrane electrode assembly. The Q value may be regarded as an indicator of adhesion of the electrode 10 to the polymer electrolyte membrane 11, and it has been found that with the Q value of 0.09–0.18 C/cm$^2$, an excellent polymer electrolyte membrane electrode assembly is obtained.

(2) Mechanical Strength

Each composite polymer electrolyte membrane was measured with respect to tensile strength according to JIS K7127. The measurement results are shown in Table 2.

TABLE 2

| No. | Voltage (V) | Q value (C/cm$^2$) | Tensile Strength (kgf/cm$^2$) |
| --- | --- | --- | --- |
| EXAMPLE 5 | 0.78 | 0.17 | 720 |
| EXAMPLE 6 | 0.76 | 0.14 | 840 |
| COMPARATIVE EXAMPLE 1 | 0.64 | 0.06 | 620 |
| COMPARATIVE EXAMPLE 2 | 0.62 | 0.09 | 640 |
| COMPARATIVE EXAMPLE 3 | 0.69 | 0.07 | 680 |

It is clear from the above measurement results that the composite polymer electrolyte membrane of the present invention has improved voltage-generating performance, higher adhesion to the reinforcing material, and improved mechanical strength, as compared with the conventional polymer electrolyte membranes.

As described above in detail, by subjecting an ion-conducting, aromatic polymer membrane having a high initial water content to a proper hot-water treatment, it is possible to obtain a polymer electrolyte membrane having a low dependency of ion conductivity on humidity.

In addition, because the composite polymer electrolyte membrane of the present invention is constituted by a matrix made of a sulfonated aromatic polymer having a high ion exchange capacity and a reinforcing material made of a sulfonated aromatic polymer having a low ion exchange capacity, it has good ion conductivity, excellent adhesion therebetween, and high mechanical strength. Accordingly, the composite polymer electrolyte membrane of the present invention is excellent in hot water resistance, oxidation resistance and creep resistance (durability).

What is claimed is:

1. A membrane electrode assembly comprising a pair of electrodes, and a polymer electrolyte membrane sandwiched by both electrodes, said polymer electrolyte membrane being obtained by subjecting an ion-conducting, aromatic polymer membrane to a hot-water treatment, said ion-conducting, aromatic polymer membrane having a maximum water absorption in a range of 80–300 weight % based on its dry weight before said hot-water treatment, wherein said ion-conducting, aromatic polymer membrane is a sulfonated polyarylene membrane, wherein said sulfonated polyarylene membrane is subjected to a hot-water treatment by immersion in hot water at 80–95° C. for 0.5–5 hours by itself or in the form of a membrane electrode assembly, wherein said sulfonated polyarylene is a sulfonated arylene copolymer obtained by introducing a sulfonic group into a side chain of a copolymer comprising 30–95 mol % of a first aromatic monomer unit represented by the following chemical formula (1):

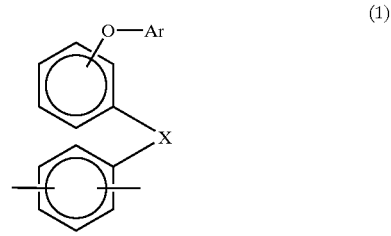

(1)

wherein Ar is an aryl group, and X is a bivalent electron-attractive group selected from the group consisting of —CO—, —CONH—, —(CF$_2$)$_p$— wherein p is an integer of 1–10, —C(CF$_3$)$_2$—, —COO—, —SO— and —SO$_2$—, and 70–5 mol % of a second aromatic monomer unit represented by the following chemical formula (2):

(2)

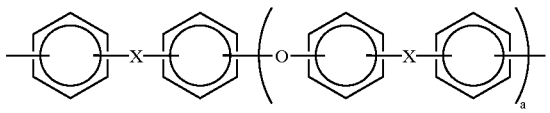

wherein X is the same as in the chemical formula (1) and may be the same as or different from each other, and a is an integer of 0–3.

2. A membrane electrode assembly comprising a pair of electrodes, and a polymer electrolyte membrane sandwiched by both electrodes, said polymer electrolyte membrane being obtained, by subjecting an ion-conducting, aromatic polymer membrane to a hot-water treatment, said ion-conducting, aromatic polymer membrane having a maximum water absorption in a range of 80–300 weight % based on its dry weight before said hot-water treatment, wherein said ion-conducting, aromatic polymer membrane is a sulfonated polyarylene membrane, and wherein said sulfonated polyarylene is a sulfonated arylene copolymer obtained by introducing a sulfonic group into a side chain of a copolymer comprising 30–95 mol % of a first aromatic monomer unit represented by the following chemical formula (1):

(1)

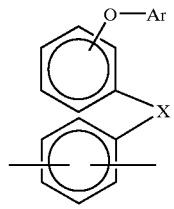

wherein Ar is an aryl group, and X is a bivalent electron-attractive group selected from the group consisting of —CO—, —CONH—, —(CF$_2$)$_p$— wherein p is an integer of 1–10, —C(CF$_3$)$_2$—, —COO—, —SO— and —SO$_2$—, and 70–5 mol % of a second aromatic monomer unit represented by the following chemical formula (2):

(2)

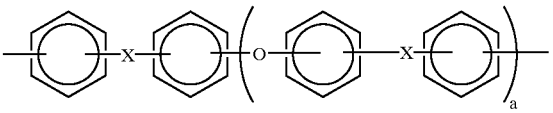

wherein X is the same as in the chemical formula (1) and may be the same as or different from each other, and a is an integer of 0–3.

3. A polymer electrolyte fuel cell constituted by stacking a plurality of membrane electrode assemblies via separator plates, each membrane electrode assembly comprising a pair of electrodes and a polymer electrolyte membrane sandwiched by both electrodes, said polymer electrolyte membrane being obtained by subjecting an ion-conducting, aromatic polymer membrane to a hot-water treatment, said ion-conducting, aromatic polymer membrane having a maximum water absorption in a range of 80–300 weight % based on its dry weight before the hot-water treatment, wherein said ion-conducting, aromatic polymer membrane is a sulfonated polyarylene membrane, wherein said sulfonated polyarylene membrane is subjected to the hot-water treatment by immersion in hot water at 80–95° C. for 0.5–5 hours by itself or in the form of a membrane electrode assembly, wherein said sulfonated polyarylene is a sulfonated arylene copolymer obtained by introducing a sulfonic group into a side chain of a copolymer comprising 30–95 mol % of a first aromatic monomer unit represented by the following chemical formula (1):

(1)

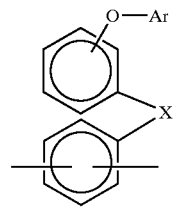

wherein Ar is an aryl group, and X is a bivalent electron-attractive group selected from the group consisting of —CO—, —CONH—, —(CF$_2$)$_p$— wherein p is an integer of 1–10, —C(CF$_3$)$_2$—, —COO—, —SO— and —SO$_2$—, and 70–5 mol % of a second aromatic monomer unit represented by the following chemical formula (2):

(2)

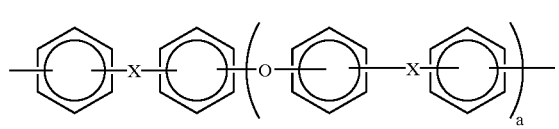

wherein X is the same as in the chemical formula (1) and may be the same as or different from each other, and a is an integer of 0–3.

4. A polymer electrolyte fuel cell constituted by stacking a plurality of membrane electrode assemblies via separator plates, each membrane electrode assembly comprising a pair of electrodes and a polymer electrolyte membrane sandwiched by both electrodes, said polymer electrolyte membrane being obtained by subjecting an ion-conducting, aromatic polymer membrane to a hot-water treatment, said ion-conducting, aromatic polymer membrane having a maximum water absorption in a range of 80–300 weight % based on its dry weight before the hot-water treatment, wherein said ion-conducting, aromatic polymer membrane is a sulfonated polyarylene membrane, and wherein said sulfonated polyarylene is a sulfonated arylene copolymer obtained by introducing a sulfonic group into a side chain of a copolymer comprising 30–95 mol % of a first aromatic monomer unit represented by the following chemical formula (1):

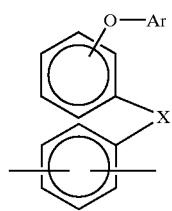 (1)

wherein Ar is an aryl group, and X is a bivalent electron-attractive group selected from the group consisting of —CO—, —CONH—, —$(CF_2)_p$— wherein p is an integer of 1–10, —$C(CF_3)_2$—, —COO—, —SO— and —$SO_2$—, and 70–5 mol % of a second aromatic monomer unit represented by the following chemical formula (2):

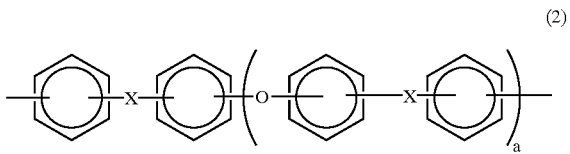 (2)

wherein X is the same as in the chemical formula (1) and may be the same as or different from each other, and a is an integer of 0–3.

* * * * *